United States Patent [19]

Kolb

[11] Patent Number: 5,758,923
[45] Date of Patent: Jun. 2, 1998

[54] FOLDING TOP FOR A PASSENGER VEHICLE

[75] Inventor: Eugen Kolb, Stuttgart, Germany

[73] Assignee: Dr.Ing. h.c.F. Porsche AG, Germany

[21] Appl. No.: 705,143

[22] Filed: Aug. 29, 1996

[30] Foreign Application Priority Data

Sep. 4, 1995 [DE] Germany .................. 195 32 567.2

[51] Int. Cl.$^6$ ........................................ B60J 7/12
[52] U.S. Cl. ................................. 296/107; 296/117
[58] Field of Search ........................ 296/107, 117, 296/136

[56] References Cited

U.S. PATENT DOCUMENTS 2,895,764  7/1959  Himka et al. .................. 296/117

FOREIGN PATENT DOCUMENTS

| 775822 | 1/1935 | France . |
| 38 26 788 | 2/1990 | Germany . |
| 43 16 485 | 11/1994 | Germany . |

OTHER PUBLICATIONS

"The New Mercedes–Benz Roadster–Body: Air COnditioning, Folding Top and Closing." G. Huber et al., ATZ Automobiltechnische Zeitschrift 91 (1989), 6, pp. 309–318.

Primary Examiner—Andrew C. Pike
Attorney, Agent, or Firm—Evenson, McKeown, Edwards & Lenahan, P.L.L.C.

[57] ABSTRACT

A folding top for a vehicle, particularly a passenger car, can be displaced, via a driving device, automatically from a closed position spanning a passenger compartment into a rear-side deposited position in which it is received in a folding top compartment provided with a folding top compartment lid. The driving device has at least one driving element interacting with the folding top structure of the folding top. The driving element applied to the folding top structure comprises a first crank mechanism which is in an operative connection with a gearing unit which is driven by an electric motor and is stationary on the body side, and is coupled with the folding top compartment lid by way of a mechanical forced control. The first crank mechanism has a first crank arm and a first connecting rod connected with the free end of the first crank arm and a control arm of the folding top structure. The mechanical forced control is provided by a second crank mechanism composed of a second crank arm and a second connecting arm.

14 Claims, 7 Drawing Sheets

FOLDING TOP FOR A PASSENGER VEHICLE

BACKGROUND AND SUMMARY OF THE INVENTION

The present invention relates to a folding top for a vehicle, such as a passenger car, and more particularly, to a folding top compartment displaced by means of a driving device automatically from a closed position spanning the passenger compartment into a rear-side deposited position in which it is received in a folding top compartment equipped with a folding top compartment lid, and the driving device comprises at least one driving element interacting with the folding top structure of the folding top.

An article entitled "The New Mercedes-Benz Roadster—Body: Air Conditioning, Folding Top and Closing" by G. Huber, W. Volz, H. Möller and K. Claar in *ATZ Automobiltechnische Zeitschrift* 91(1989), 6, Pages 309 to 318 describes an electrohydraulically driven folding top for a passenger car. The driving device for the folding top comprises a plurality of driving elements (namely, hydraulic cylinders) and microswitches. Thus, in addition to the individual locks, separate hydraulic cylinders are in each case assigned to the folding top structure, the rear-side fabric holding bow, and the folding top compartment lid. The individual moving sequences during the opening and closing operation of the folding top are controlled by a sequence control.

During the opening operation of the aforementioned known folding top, the fabric holding bow of the folding top is swivelled upwards. Then the folding top compartment lid is moved into its open position. Subsequently the folding top with the fabric holding bow is deposited in the folding top compartment. Finally, the folding top compartment lid is lowered into its closed position. Because of the large number of hydraulic cylinders and microswitches, this driving device has the disadvantage, however, of a high-expenditure construction and of therefore being cost intensive. Because with a sequence control, the individual moving sequences take place consecutively and a new moving sequence is not started before the preceding moving sequence is concluded, the opening and closing operation of the folding top requires a relatively large amount of time.

It is an object of the present invention to further improve a driving device for a semiautomatic or fully automatic folding top compartment lid to simplify the construction of the driving device and also to shorten the time for the opening and closing operation.

According to the present invention, this object has been achieved by providing that the driving element applied to the folding top structure comprises a first crank mechanism which is in an operative connection with a gearing unit which is driven by an electric motor and is stationary on the body side, and in that the driving element driving the folding top structure is coupled by way of a mechanical forced control with the folding top compartment lid.

Principal advantages achieved with the invention are that the driving device, which has only driving elements for the folding top structure, has a simple construction and is coupled to the folding top compartment lid by way of a mechanical forced control. Thereby a superimposed movement of the folding top and the folding top compartment lid takes place during the opening and closing operation. With this superimposed movement, the time expenditures for the opening and closing operation are significantly reduced.

The driving element for the folding top structure comprises a first crank mechanism which is in an operative connection with a gearing unit driven by an electric motor. The mechanical forced control is formed by a second crank mechanism which is connected to the first crank mechanism and to the folding top compartment lid. The two crank mechanisms have a simple construction. By way of the driving device according to the present invention, a superimposed movement of the folding top and the folding top compartment lid is achieved. Because of the kinematics of the two crank mechanisms, the folding top is thereby moved relatively slowly in a first phase and the folding top compartment lid is moved relatively fast. In a second phase, the folding top is moved relatively fast and the folding top compartment lid is moved relatively slowly. In a third phase, the folding top is again moved relatively slowly and the folding top compartment lid is moved relatively fast. In the area of the extended position of a crank mechanism, the linked part (i.e., folding top, folding top compartment lid) in each case moves relatively slowly. The two crank arms are preferably combined to form a joint angle lever.

BRIEF DESCRIPTION OF THE DRAWINGS

These and other objects, features, and advantages of the present invention will become more readily apparent from the following detailed description thereof when taken in conjunction with the accompanying drawings wherein.

DETAILED DESCRIPTION OF THE DRAWINGS

Figure 1:
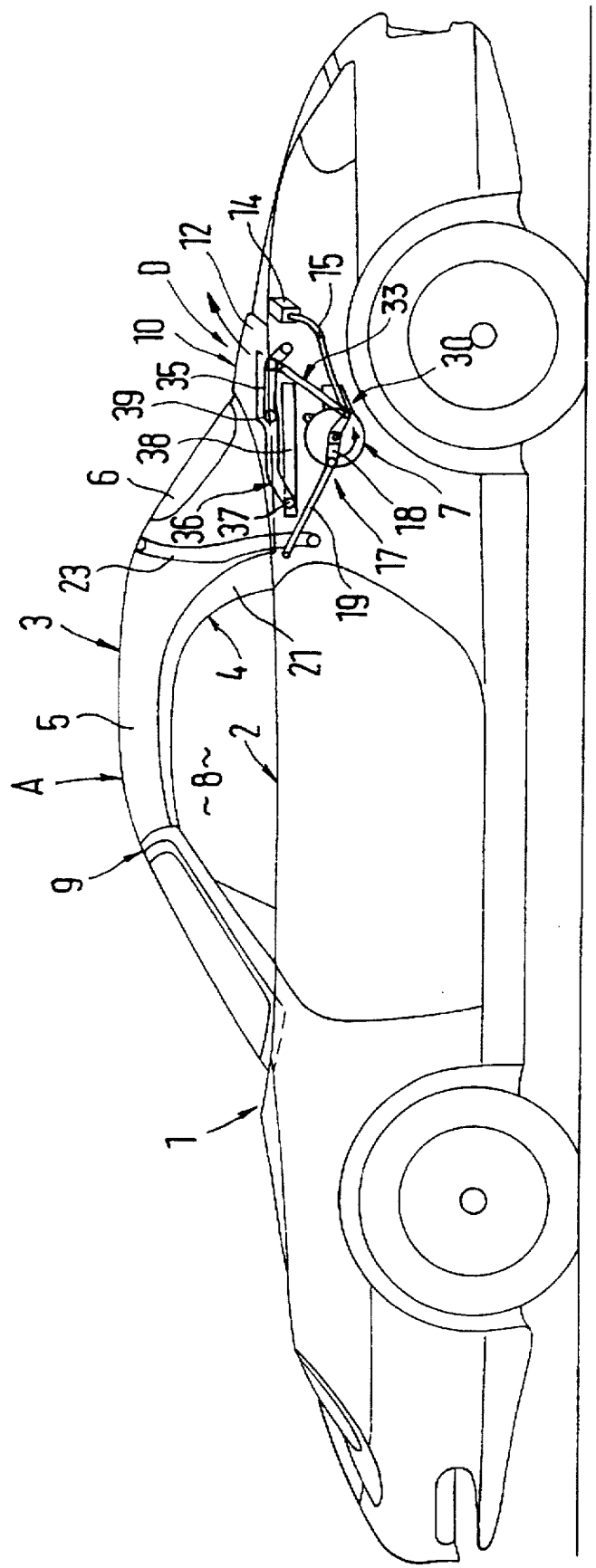
FIG. 1 is a side view of a passenger car having a folding top and a folding top compartment lid, each in the closed position, and a driving device for the folding top and the folding top compartment lid.

FIG. 1 illustrates a convertible passenger car 1 which has a folding top 3 above a beltline 2. The folding top 3 is a folding or convertible top composed of a folding top structure 4 which is swivellably connected to the vehicle body, and of a folding top covering, 5 which is held in position on it. In the rearward area of the folding top covering 5, a viewing pane 6 is formed by a flexible or rigid rear pane.

Figure 3:
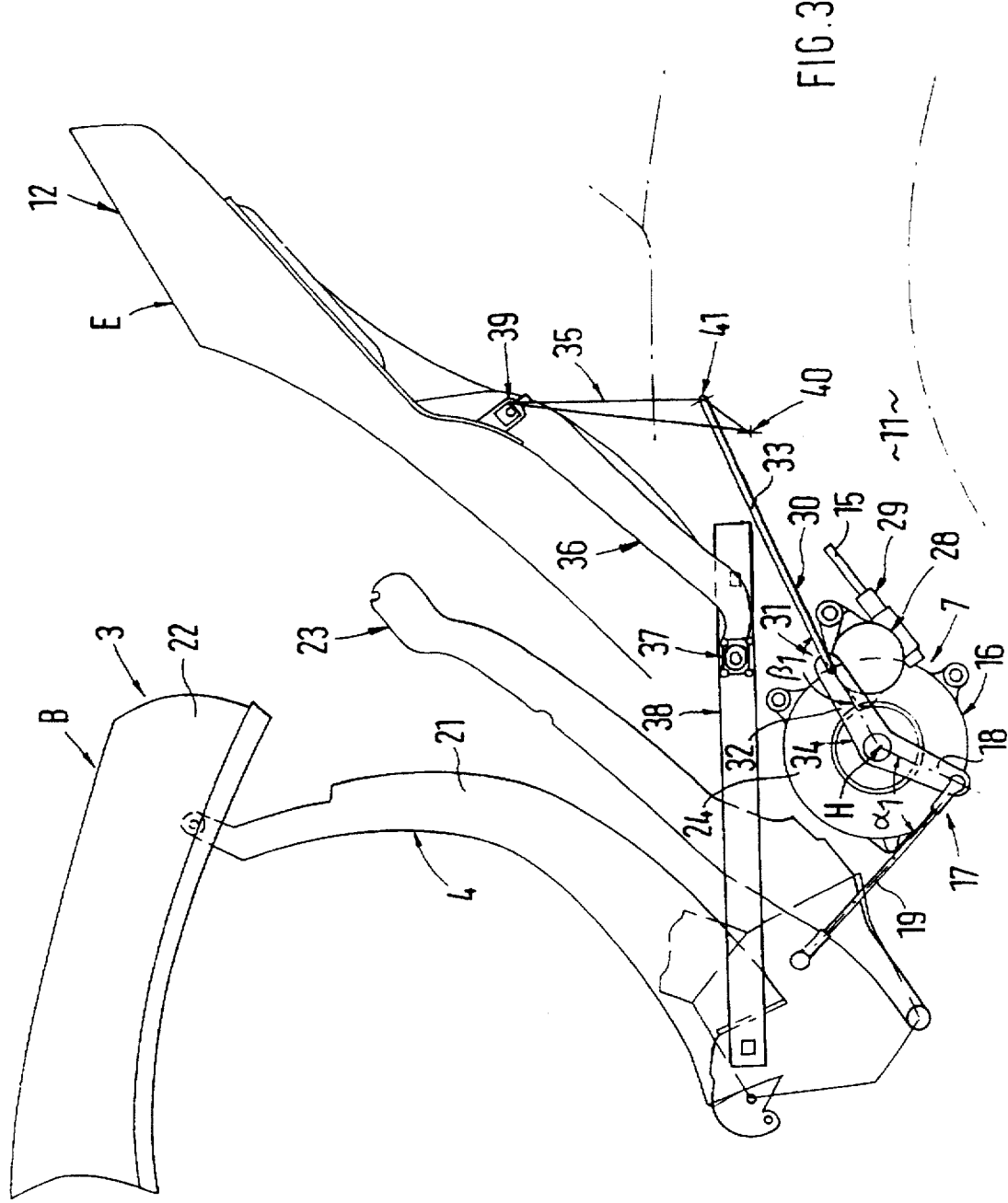
FIG. 3 is an enlarged partial side view of the folding top and of the folding top compartment lid, the folding top assuming a folded-back intermediate position and the folding top compartment lid assuming an open position.
Figure 4:
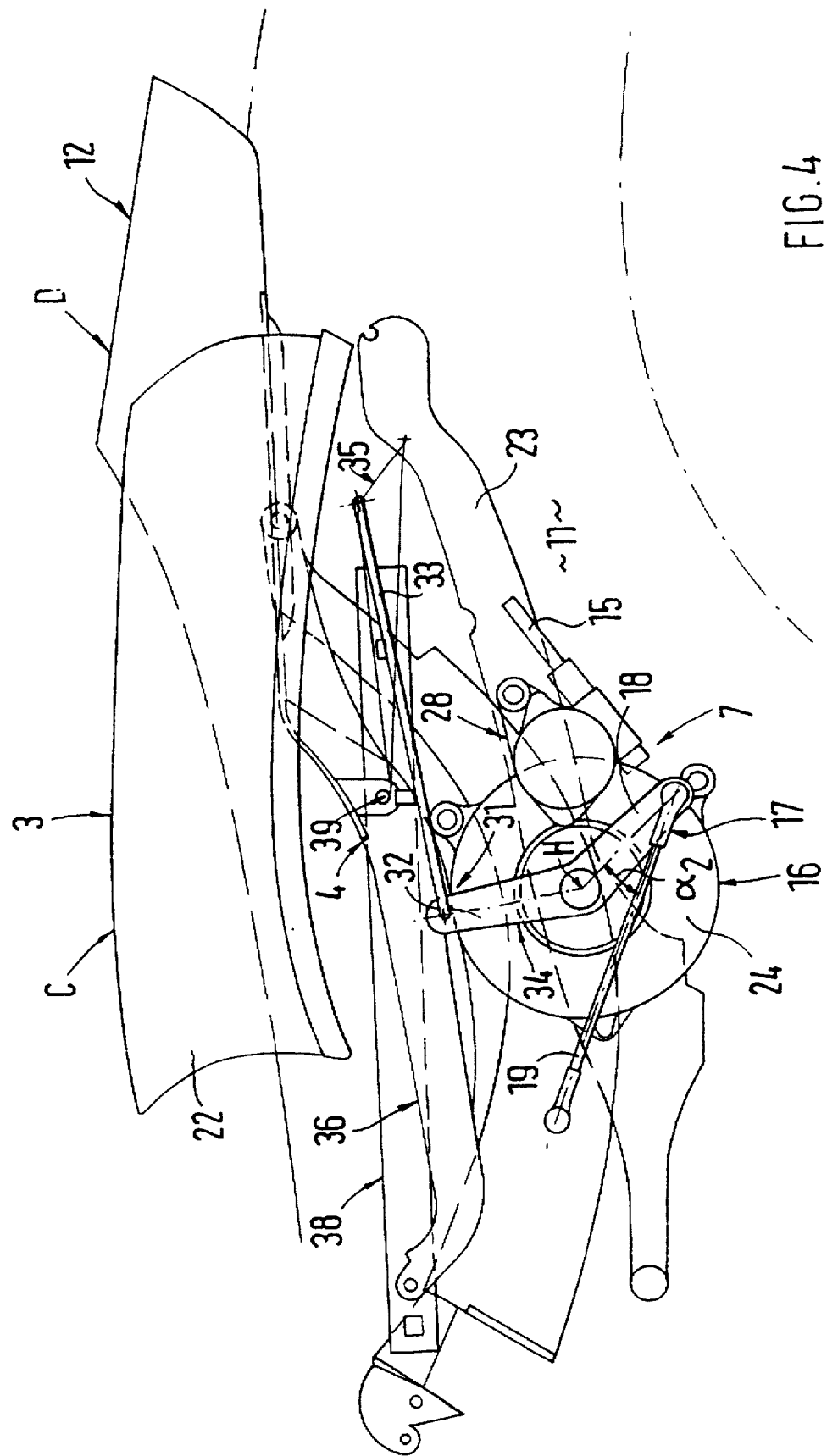
FIG. 4 is an enlarged partial side view of the folding top in the deposited position and of the folding top compartment lid in the closed position and of the driving device.
Figure 5:
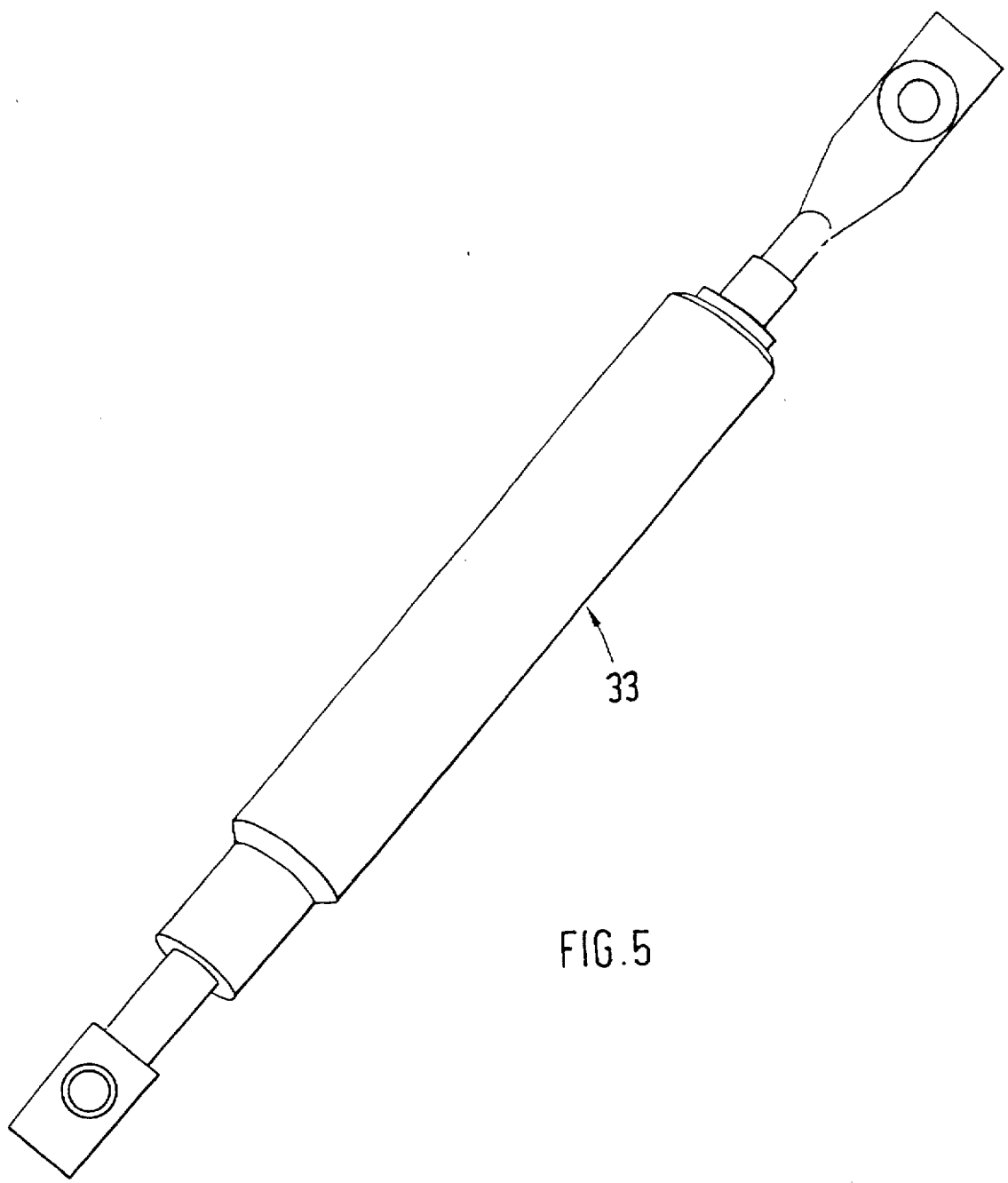
FIG. 5 is an enlarged isolated view of the second connecting rod in FIG. 1.

Via a driving device designated generally by numeral 7, the folding top 3 can be displaced from a closed position A spanning the passenger compartment 8 by way of intermediate positions (for example, B in FIG. 3) toward the rear into a rear-side deposited position C in FIG. 4, with the opening and closing operation taking place automatically.

In the closed position A in FIG. 1, the folding top 3 extends from a windshield frame 9 to a rear area 10 and is held in position on the windshield frame 9 by way of at least one releasable locking device. A manual locking and unlocking of the folding top 3 on the windshield frame 9 is provided. However, this operation can also take place automatically, i.e., by a motor in a conventional manner which need not be described in detail.

In the deposited position C (FIG. 4), the folded-together folding top 3 is accommodated in a rear-side receiving space which is formed, for example, by a folding top compartment 11. In the upward direction, the folding top compartment 11 is covered at least in areas by a folding top compartment lid 12 situated above the folding top compartment 11. By way of the driving device 7, the folding top 3 can be moved between the closed position A and the deposited position C, and the folding top compartment lid 12 can be moved between a closed position D (FIG. 1) and an open position E (FIG. 3).

Figure 2:
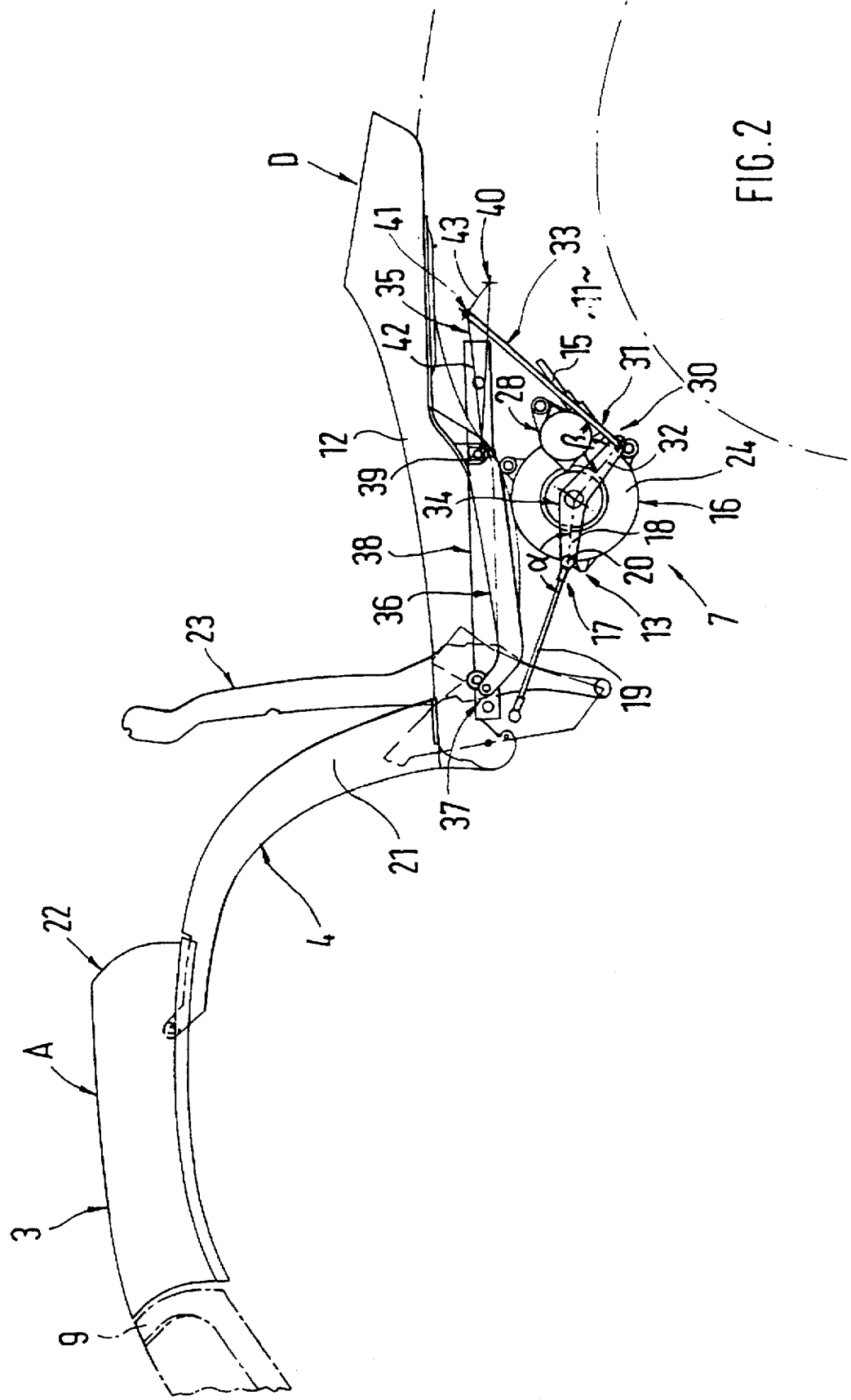
FIG. 2 is an enlarged partial side view of the folding top in the closed position, of the driving device, and of the folding top compartment lid in the closed position.

The driving device 7 for the folding top 3 comprises, as seen in FIG. 2, at least one driving element 13 which interacts with the folding top structure 4 and which is in an operative connection with a conventional control unit and with an operating key, and is arranged on the center console in the passenger compartment 8. By virtue of the pressing of the operating key, the folding top 3 is automatically moved from the closed position A via the intermediate positions (for example, B) into the deposited position C and vice versa.

A separate driving element 13 is provided on each longitudinal side of the folding top structure 4. The driving element 13 for moving the folding top structure 4 comprises an electric driving motor 14 which is connected by way of bendable shafts 15 with laterally exterior gearing units 16 which are fastened on the body side. In addition, the driving element 13 comprises a first crank mechanism 17 which is in an operative connection with the folding top structure 4 and with the gearing unit 16.

The first crank mechanism 17 is composed of a first crank arm 18 and of a first connecting rod 19. The first connecting rod 19 is connected in an articulated manner with the free end 20 of the first crank arm 18 and a control arm 21 of the folding top structure 4. The control arm 21 is formed by a B-column control arm.

For the swivelling of a dimensionally stable, forward folding top section 22, main control arms are provided on both longitudinal sides of the folding top structure 4, in which the ends of the main control arm and of the B-column control arm connected with the folding top section 22 and with the vehicle body form corner points of a parallelogram such as a four-bar arrangement. FIGS. 2 to 4 also show a main hoop 23 of the folding top structure 4.

The first crank arm 18, outside a housing 24 of the gearing unit 16, is fixedly connected with a bearing pin, in which the bearing pin within the housing 24 carries a vertically arranged tooth segment of a spur wheel gear. Each gearing unit 16 comprises a spur wheel gear arranged in a stationarily disposed housing 24 and a planetary gear 28 interacting with the spur wheel gear. The gearing unit 16 is held in position on an adjoining side wall of the vehicle body by fastening screws. The planetary gear 28 is connected with a free end 29 of the bendable shaft 15. The gearing unit can also have, however, a different construction.

The driving elements 13 interacting with the folding top structure 4 are each coupled by way of a mechanical forced control 30 to the folding top compartment lid 12 such that, during the opening and closing operation of the folding top 3, a superimposed movement of the folding top 3 and of the folding top compartment lid 12 takes place.

The mechanical forced control 30 is formed by a second crank mechanism 31 which is connected to the first crank mechanism 17 and to folding top compartment lid 12. The second crank mechanism 31 is composed of a second crank arm 32 and of a second connecting rod 33. The crank arms 18, 32 extend at an angle δ which in the embodiment amounts to approximately 140°. In a currently preferred embodiment, the two crank arms 18, 32 are combined to form an angle lever 34. The crank arm 32 has a slightly larger longitudinal dimension than the other crank arm 18. The second connecting rod 33 is connected in an articulated manner with the free end of the crank arm 32 and with a steering lever 35 of the folding top compartment lid 12.

In its two longitudinal sides, the folding top compartment lid 12 has one elongated guiding arm 36 respectively which is fastened to the bottom side of the folding top compartment lid 12 for example, of screws or the like. An area of the guiding arm 36 which protrudes over the folding top compartment lid 12 toward the front is provided with a sliding element 37 which interacts with a guide rail 38 which is stationary on the body side and extends approximately horizontally. The laterally exterior guide rails 38 which extend in the longitudinal direction of the passenger car, in cross-sectional view, have an approximately C-shaped profile, in which the sliding element 37 is displaceably accommodated within the guide rail 38 in a generally known manner. In side view, the standing guide rail 38, is arranged such that its open side faces the sliding element 37. The sliding element 37 is formed by a roll, a plate-shaped element with projecting spherical cap sections arranged on the corner side, or the like.

An end 39 of the steering lever 35 is rotatably disposed approximately in a center area of the longitudinal dimension of the guiding arm 36. The other end 40 of the angularly constructed steering lever 35 is rotatably disposed on the adjoining vehicle body by means of a holder.

Figure 6:
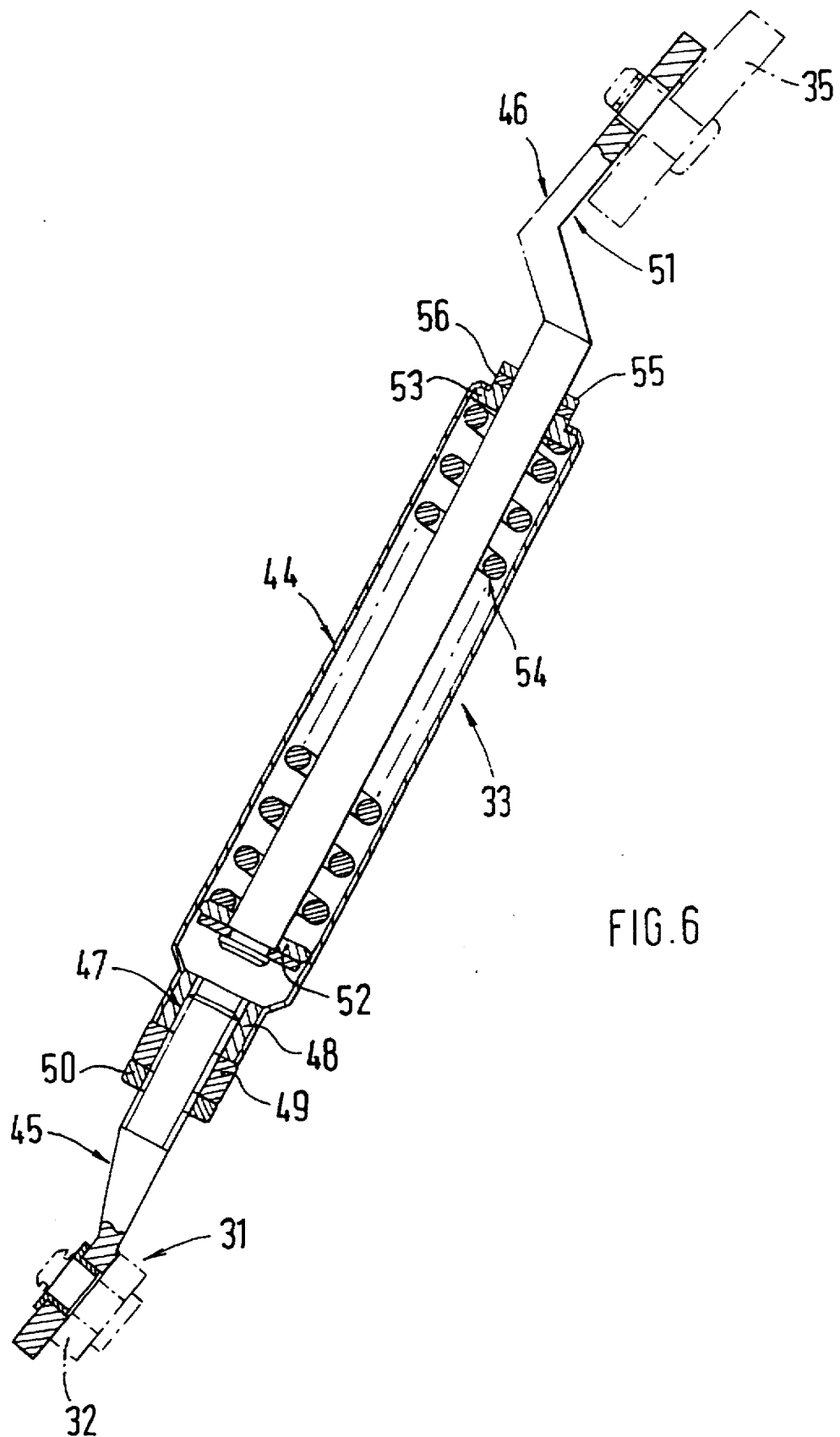
FIG. 6 is a sectional view of the second connecting rod of FIG. 5.
Figure 7:
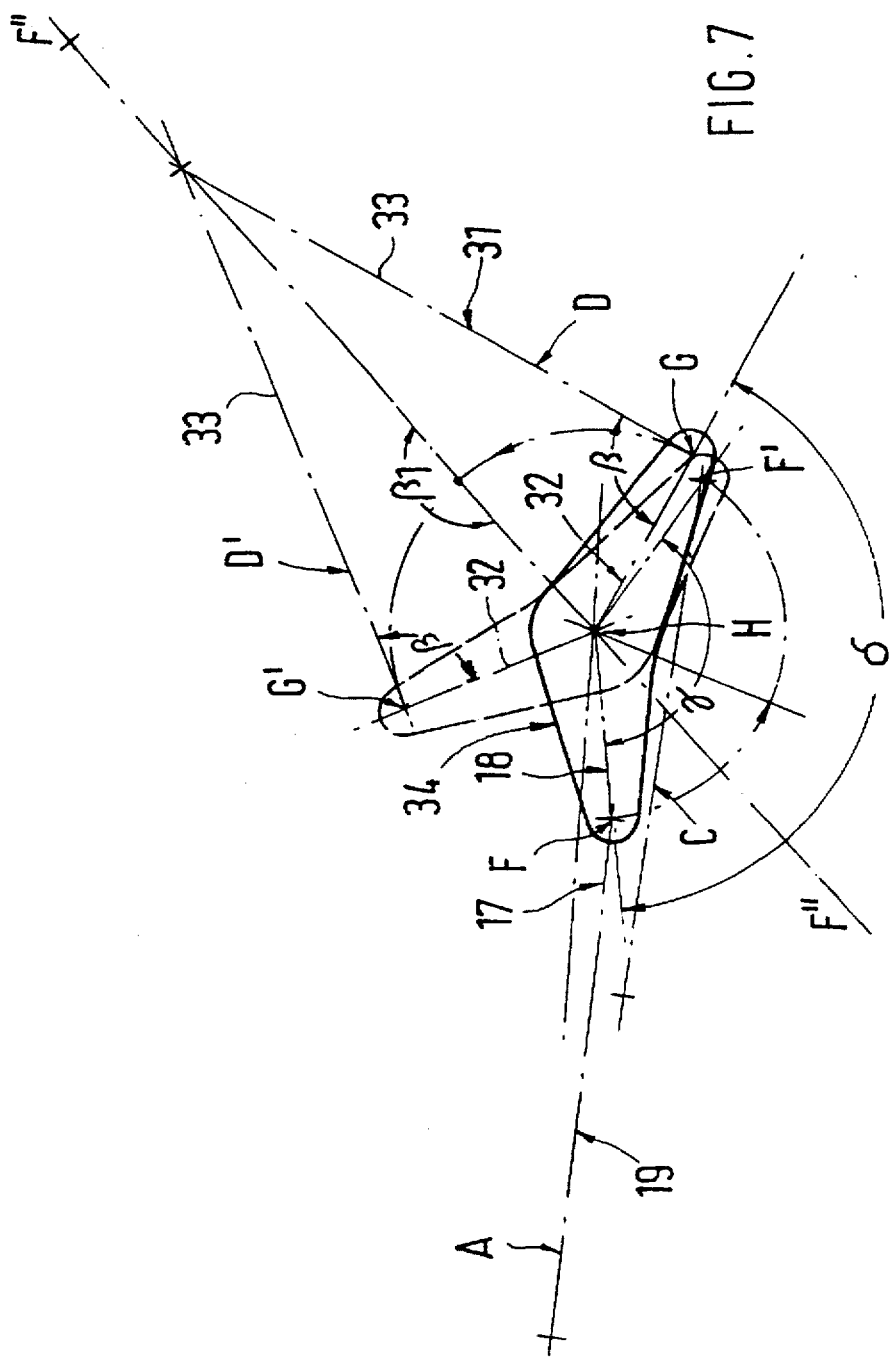
FIG. 7 is a function diagram of the two crank mechanisms during the opening and closing operation of the folding top.

The rearward end of the second connecting rod 33 is applied approximately to the intersection point of the two angularly joined sections 42, 43. The second connecting rod 33 is constructed in several parts and comprises a tube-shaped housing 44 as well as two connecting rod elements 45, 46 as seen best in FIG. 6. The shorter connecting rod element 45, which forms a tolerance compensating element, is screwed into a threaded sleeve 47 provided on the end side on the housing 44. The threaded sleeve 47 has a continuous internal thread and is composed of a cylindrical section 48 pushed into the cylindrical housing 44 and of an area 49 which projects over the housing, and is constructed as a nut on its exterior side. On the external thread of the connecting rod element 45, a lock nut 50 is disposed in front of the area 49. The connecting rod element 45 is connected in an articulated manner to the crank arm 32 of the second crank mechanism 31.

By rotating the housing 44 relative to the connecting rod element 45 or vice versa, mounting and manufacturing tolerances of the vehicle body and the driving device 7 can be compensated in a simple manner by a change of the length of the connecting rod 33. The connecting rod element 46 forms a spring-supported and length-changeable tension/compression element. The free flattened end 51 of the connecting rod element 46 which protrudes from the housing 44 is rotatably connected with the steering lever 35. Inside the housing 44, a pressure spring 54 is arranged between an end-side locking washer 52 of the connecting rod element 46 and an abutment 53. The pressure spring 54 coaxially surrounds the connecting rod element which, in areas, has a cylindrical construction.

Outside the housing 44, a stationary stop 55 is mounted on the longer connecting rod element 46 and extends at a narrow distance to the abutment 53. Between the abutment 53 and the stop 55, a mounting disk 56 is clamped in which, after the installation into the passenger car, falls out during the tensioning of the pressure spring 54 when the correct prestressing is set.

Locally, the folding top compartment lid 12 has a microswitch of conventional construction and which reports to the control unit that the folding top compartment lid 12 is still approximately 5 mm from its closed position D. Subsequently, the electric motor 14 will continue to run for a certain slow-down time (e.g., adjustable to between 0.1 and 1.0 sec.) and will pull the folding top compartment lid 12 downward into its closed position D in which it rests on body-side supporting blocks. As a result of the multipart construction of the connecting rod 33 and of the pressure spring 54, these movements are compensated by the change of length without any deformation of the components of the driving device 7 or of the body. By prestressing of the pressure spring 54, the folding top compartment lid 12 is pressed downward with a defined force into its closed position D, and the connecting rod 33 is lengthened.

When the folding top 3 is closed (position A) and the folding top compartment lid 12 is closed (position D), the sliding element 37 interacting with the guide rail 38 is situated adjacent to the forward end of the guide rail 38 (FIG. 2). The steering lever 35 of the folding top compartment lid 12 is aligned approximately horizontally. The connecting rod 19 and the crank arm 18 of the first crank mechanism take up an almost stretched-out position. That is, the connecting rod 19 and the crank arm 18 enclose an angle α between one another which is slightly smaller than 180°. In this position, the second crank arm 32 and the second connecting rod 33 extend at an angle β of approximately 90° to 100°.

After detaching the folding top 3 from the windshield frame 9, the electric motor 14 is controlled by pressing the operating key. By way of the driving device 7, in a first moving phase, the folding top 3 is moved from the windshield frame 9 toward the rear into the intermediate position B and, at the same time, the folding top compartment lid 12 is moved from the closed position D into the open position E (FIG. 3). The two crank arms 18, 32, which are arranged rigidly with respect to one another, are swivelled counterclockwise about the rotation point H.

FIG. 3 shows the intermediate position B of the folding top 3 in which the folding top compartment lid 12 takes up its open position E. Because initially, the first crank mechanism 17 assumes an almost stretched-out position, the folding top 3 is moved relatively slowly toward the rear in this phase, but the folding top compartment lid 12, because of the construction of the kinematics of the second crank mechanism 31, is moved relative rapidly from the closed position D into the open position E.

When the folding top 3 is swivelled into the intermediate position B, the angle α between the connecting rod 19 and the crank arm 18 is continuously reduced and, in this intermediate position B, takes up an angle α1 (FIG. 3) of slightly less than 90°. The angle β between the second connecting rod 33 and the crank arm 32 is enlarged during the opening movement of the folding top compartment lid 12, the angle β1, in the opened position of the folding top compartment lid 12, amounting to approximately 180°, i.e., the crank mechanism 31 is in the stretched-out position. For this reason, the position of the folding top compartment lid 12 changes only slightly during the following further rotating movement of the two crank arms 18, 32. By contrast, the folding top 3 now moves downward relatively fast, dips in under the folding top compartment lid 12 and moves in the direction of the folding top compartment 11. During the opening operation of the folding top compartment lid 12, the steering lever 35 is swivelled upwards counterclockwise about the fixed point of rotation 40, and the guiding arm 36 with the sliding element 37 travels toward the rear in the guide rail 38. As a result, the folding top compartment lid 12 is placed in its diagonally extending open position E seen in FIG. 3. By way of a further counterclockwise rotation of the two crank arms 18, 32, the folding top 3 is displaced in the deposited position C and the folding top compartment lid 12 is displaced again in its closed position D (FIG. 4).

In the deposited position C of the folding top 3, the first connecting rod 19 takes up an acute angle α2 (FIG. 4) with respect to the first crank arm 18. During the movement of the folding top 3 from the intermediate position B into the deposited position C, the angle decreases from α1 to α2. The angle β between the second crank arm 32 and of the connecting rod 33 is just as large in the deposited position C of the folding top 3 as in the closed position of the folding top 3.

The point of intersection F between the first connecting rod 19 and the first crank arm 18 travels during the opening movement of the folding top 3 on a circular path counterclockwise and, in the deposited position D', takes up position F. The point of intersection G of the second connecting rod 33 and the crank arm 32 also moves on a circular path during the opening operation of the folding top 3 and travels into position G'. The spatial positions of the second connecting rod 33 and the crank arm 32 differ in both closing positions of the folding top compartment lid 12; they specifically extend symmetrically with respect to an auxiliary plane F"—F", in which case the auxiliary plane F"—F" corresponds to the stretched-out position of the crank mechanism 31 in the open position E of the folding top compartment lid 12.

During the opening operation of the folding top 3, the first crank arm 18 is moved counterclockwise by an angle Y about the point of rotation H. As the result, the folding top 3 is displaced from the closed position A into the deposited position B. During the opening operation of the folding top 3, the second crank arm 32 is also rotated by the angle Y counterclockwise about the point of rotation H. During the movement of the folding top 3 from the closed position A into the deposited position C, however, the folding top compartment lid 12 carries out a first opening movement and a subsequent second closing movement.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Folding top for a passenger vehicle, comprising a driving device configured to automatically displace the folding top from a closed position spanning a passenger compartment into a rear-side deposited position for being received in a folding top compartment equipped with a folding top compartment lid, the driving device comprising at least one driving element interacting with folding top structure of the folding top, wherein the driving element comprises a first crank mechanism operatively connected with a gearing unit driven by an electric motor and stationary on a body side, the driving element driving the folding top structure being coupled by way of a mechanical forced control with the folding top compartment lid.

2. The folding top according to claim 1, wherein the mechanical forced control, during opening and closing operation of the folding top, causes a superimposed movement of the folding top and the folding top compartment lid.

3. The folding top according to claim 1, wherein the mechanical forced control comprises a second crank mechanism operatively connected to the first crank mechanism and the folding top compartment lid.

4. The folding top according to claim 3, wherein the mechanical forced control, during opening and closing operation of the folding top, causes a superimposed movement of the folding top and the folding top compartment lid.

5. The folding top according to claim 3, wherein the second crank mechanism comprises a second crank arm and a second connecting rod, the second crank arm being operatively connected with the gearing unit, and the second connecting rod being connected in an articulated manner, on one side thereof, with a free end of the second crank arm and, on another side thereof, with a steering lever of the folding top compartment lid.

6. The folding top according to claim 5, wherein the first crank mechanism comprises a rotatable first crank arm rigidly connectable with the gearing unit, and a first connecting rod connected in an articulated manner with a free end of the first crank arm and a control arm of the folding top structure.

7. The folding top according to claim 6, wherein the two crank arms form a joint rigid angle lever and extend at an angle with respect to one another.

8. The folding top according to claim 6, wherein, during a counterclockwise rotating movement of the first crank arm by a predetermined angle, the folding top is displaced from the closed position by way of intermediate positions into the rear-side deposited position, and during a synchronous rotating movement of the second crank arm, the folding top compartment lid carries out a first opening movement and a subsequent closing movement.

9. The folding top according to claim 8, wherein, in the rear-side deposited position, the first connecting rod and the first crank arm take up an approximately stretched-out position, and an opening angle between the first connecting rod and the first crank arm is continuously reduced during movement of the folding top from the closed position and becomes an acute angle in the rear-side deposited position.

10. The folding top according to claim 9, wherein a second, opening movement angle between the second crank arm and the second connecting rod, during the opening movement of the folding top compartment lid, increases continuously to a stretched-out position angle in an open position of the folding top compartment lid and, during the subsequent closing movement of the folding top compartment lid, decreases again to the second, opening movement angle.

11. The folding top according to claim 8, wherein the second crank arm and the second connecting rod, when the folding top compartment lid is closed, in the closed position and in the rear-side deposited position, take up two spatial positions extending symmetrically with respect to a position which the second crank arm and the second connecting rod take up in an opened position of the folding top compartment lid.

12. The folding top according to claim 1, wherein the first crank mechanism comprises a rotatable first crank arm rigidly connectable with the gearing unit, and a first connecting rod connected in an articulated manner with a free end of the first crank arm and a control arm of the folding top structure.

13. The folding top according to claim 12, wherein the mechanical forced control, during opening and closing operation of the folding top, causes a superimposed movement of the folding top and the folding top compartment lid.

14. The folding top according to claim 12, wherein the mechanical forced control comprises a second crank mechanism operatively connected to the first crank mechanism and the folding top compartment lid.

* * * * *